United States Patent
Kimura et al.

(10) Patent No.: US 7,796,222 B2
(45) Date of Patent: Sep. 14, 2010

(54) DISPLAY DEVICE, INSPECTION METHOD FOR DISPLAY DEVICE, AND INSPECTION DEVICE FOR DISPLAY DEVICE

(75) Inventors: Yohei Kimura, Ishikawa-gun (JP); Koji Nakayama, Kanazawa (JP); Kazuyuki Harada, Ishikawa-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 1442 days.

(21) Appl. No.: 11/195,771

(22) Filed: Aug. 3, 2005

(65) Prior Publication Data

US 2006/0028414 A1 Feb. 9, 2006

(30) Foreign Application Priority Data

Aug. 6, 2004 (JP) ............................. 2004-231107
Aug. 6, 2004 (JP) ............................. 2004-231110

(51) Int. Cl.
    *G02F 1/133* (2006.01)
(52) U.S. Cl. ...................................... 349/139; 324/770
(58) Field of Classification Search ................ None
    See application file for complete search history.

(56) References Cited

U.S. PATENT DOCUMENTS 6,246,074 B1 * 6/2001 Kim et al. ..................... 257/48
7,304,492 B2 * 12/2007 Shiau et al. ................. 324/770
2004/0017531 A1 * 1/2004 Nagata et al. ............... 349/139
2004/0046920 A1 * 3/2004 Hayata et al. ............... 349/149

FOREIGN PATENT DOCUMENTS

| JP | 6-160898 | | 6/1994 |
| JP | 2001-13892 | | 1/2001 |
| JP | 2001-215475 | | 8/2001 |
| JP | 2003-157053 A | * | 5/2003 |
| JP | 2003-323164 | | 11/2003 |
| KR | 2001-0091922 | | 10/2001 |

OTHER PUBLICATIONS

U.S. Appl. No. 11/195,821, filed Aug. 3, 2005, Harada, et al.
U.S. Appl. No. 11/767,701, filed Jun. 25, 2007, Nakayama.

* cited by examiner

*Primary Examiner*—Mike Stahl
(74) *Attorney, Agent, or Firm*—Oblon, Spivak, McClelland, Maier & Neustadt, L.L.P.

(57) ABSTRACT

A display device includes a first wiring line group of wiring lines connected to odd-number-th scan lines, a second wiring line group of wiring lines connected to even-number-th scan lines, a first inspection wiring line connected to first wiring lines of the first wiring line group, a second inspection wiring line connected to second wiring lines of the first wiring line group, which neighbor the first wiring lines, a third inspection wiring line connected to third wiring lines of the second wiring line group, and a fourth inspection wiring line connected to fourth wiring lines of the second wiring line group, which neighbor the third wiring lines.

9 Claims, 8 Drawing Sheets

|  | First inspection signal ↓ | Second inspection signal ↓ | Third inspection signal ↓ | Fourth inspection signal ↓ |
|---|---|---|---|---|
| 52A (21) | ON | | | |
| 52B (22) | | ON | | |
| 53A (33) | | | ON | |
| 53B (34) | | | | ON |

FIG. 4

|  | First inspection step | | Second inspection step | |
|---|---|---|---|---|
|  | First inspection signal ↓ | Second inspection signal ↓ | First inspection signal ↓ | Second inspection signal ↓ |
| 52A (21) | ON | | ON | |
| 52B (22) | ON | | | ON |
| 53A (33) | | ON | ON | |
| 53B (34) | | ON | | ON |

FIG. 5

DISPLAY DEVICE, INSPECTION METHOD FOR DISPLAY DEVICE, AND INSPECTION DEVICE FOR DISPLAY DEVICE

CROSS-REFERENCE TO RELATED APPLICATIONS

This application is based upon and claims the benefit of priority from prior Japanese Patent Applications No. 2004-231107, filed Aug. 6, 2004; and No. 2004-231110, filed Aug. 6, 2004, the entire contents of both of which are incorporated herein by reference.

BACKGROUND OF THE INVENTION

1. Field of the Invention

The present invention relates to a display device that includes inspection wiring lines for inspecting a wiring defect, an inspection method for inspecting a wiring defect on the basis of inspection signals that are input to the inspection wiring lines of the display device, and an inspection device that generates inspection signals, which are input to the inspection wiring lines of the display device.

2. Description of the Related Art

A display device, such as a liquid crystal display device, includes an effective display section that is composed of display pixels arranged in a matrix. The effective display device includes a plurality of scan lines extending along rows of the display pixels, a plurality of signal lines extending along columns of the display pixels, switching elements that are disposed near intersections between the scan lines and signal lines, and pixel electrodes that are connected to the switching elements.

A wiring line group that connects a scan line driving circuit and the scan lines is, in usual cases, disposed on one end side of the effective display section. By inputting inspection signals to odd-number-th scan lines and even-number-th scan lines, it is possible to inspect a wiring defect on a panel, such as short-circuit or line breakage in the effective display section.

On the other hand, there has been proposed such a layout that an odd-number-th wiring line group comprising lines connected to odd-number-th scan lines is disposed on one end side of the effective display section, and an even-number-th wiring line group comprising lines connected to even-number-th scan lines is disposed on the other end side of the effective display section (see, e.g. Jpn. Pat. Appln. KOKAI Publication No. 06-160898 and Jpn. Pat. Appln. KOKAI Publication No. 2001-013892). This layout is optimal for a structure that adopts a single driving IC chip in which a scan line driving section and a signal line driving section are integrated.

In the case of this layout, by inputting inspection signals to the odd-number-th scan lines and even-number-th scan lines, it is possible to inspect a wiring defect in the effective display section. However, it is not possible to inspect a wiring defect in each of the wiring line groups. Consequently, a panel with a wiring defect in the wiring line group, which could not be detected, may go out to a subsequent fabrication step. In the subsequent fabrication step, expensive components, as a driving IC chip and a flexible print circuit board (FPC), are mounted. Thus, if the defective panel goes to the subsequent fabrication step, this leads to a decrease in manufacturing yield.

BRIEF SUMMARY OF THE INVENTION

The present invention has been made in consideration of the above-described problems, and the object of the invention is to provide a display device, an inspection method for a display device, and an inspection device for a display device, which can exactly detect a wiring defect on a panel and can suppress a decrease in manufacturing yield.

According to a first aspect of the present invention, there is provided a display device comprising: an effective display section composed of a plurality of display pixels; a first wiring line group that is disposed on one end side of a peripheral part, which is located on an outside of the effective display section, and that comprises wiring lines connected to odd-number-th scan lines, to which driving signals for turning on/off the display pixels on odd-number-th rows are supplied; a second wiring line group that is disposed on the other end side of the peripheral part, and comprises wiring lines connected to even-number-th scan lines, to which driving signals for turning on/off the display pixels on even-number-th rows are supplied; a first inspection wiring line that is connected to first wiring lines of the first wiring line group; a second inspection wiring line that is connected to second wiring lines of the first wiring line group, which neighbor the first wiring lines; a third inspection wiring line that is connected to third wiring lines of the second wiring line group; and a fourth inspection wiring line that is connected to fourth wiring lines of the second wiring line group, which neighbor the third wiring lines.

According to a second aspect of the invention, there is provided an inspection method for a display device, the display device comprising: an effective display section composed of a plurality of display pixels; a first wiring line group that is disposed on one end side of a peripheral part, which is located on an outside of the effective display section, and that comprises wiring lines connected to odd-number-th scan lines, to which driving signals for turning on/off the display pixels on odd-number-th rows are supplied; and a second wiring line group that is disposed on the other end side of the peripheral part, and comprises wiring lines connected to even-number-th scan lines, to which driving signals for turning on/off the display pixels on even-number-th rows are supplied, the inspection method comprising: inputting a first inspection signal to a first inspection wiring line that is connected to first wiring lines of the first wiring line group, inputting a second inspection signal to a second inspection wiring line that is connected to second wiring lines of the first wiring line group, which neighbor the first wiring lines, inputting a third inspection signal to a third inspection wiring line that is connected to third wiring lines of the second wiring line group, and inputting a fourth inspection signal to a fourth inspection wiring line that is connected to fourth wiring lines of the second wiring line group, which neighbor the third wiring lines; and inspecting, on the basis of the input of the first to fourth inspection signals, a wiring defect in the first wiring line group, a wiring defect in the second wiring line group, and a wiring defect in the odd-number-th scan lines and the even-number-th scan lines in the effective display section.

According to a third aspect of the invention, there is provided an inspection method for a display device, the display device comprising: an effective display section composed of a plurality of display pixels; a first wiring line group that is disposed on one end side of a peripheral part, which is located on an outside of the effective display section, and that comprises wiring lines connected to odd-number-th scan lines, to which driving signals for turning on/off the display pixels on odd-number-th rows are supplied; and a second wiring line group that is disposed on the other end side of the peripheral part, and comprises wiring lines connected to even-number-th scan lines, to which driving signals for turning on/off the display pixels on even-number-th rows are supplied, the inspection method comprising: inputting a first inspection signal to a first inspection wiring line, which is connected to first wiring lines of the first wiring line group, and to a second inspection wiring line that is connected to second wiring lines of the first wiring line group, which neighbor the first wiring lines, and inputting a second inspection signal to a third inspection wiring line, which is connected to third wiring lines of the second wiring line group, and to a fourth inspection wiring line that is connected to fourth wiring lines of the second wiring line group, which neighbor the third wiring lines; inspecting, on the basis of the input of the first and second inspection signals, a wiring defect in the odd-number-th scan lines and the even-number-th scan lines in the effective display section; inputting the first inspection signal to the first inspection wiring line and the third inspection wiring line, and inputting the second inspection signal to the second inspection wiring line and the fourth inspection wiring line; and inspecting, on the basis of the input of the first and second inspection signals, a wiring defect in the first wiring line group and a wiring defect in the second wiring line group.

According to a fourth aspect of the invention, there is provided an inspection device for a display device, the display device comprising: an effective display section composed of a plurality of display pixels; a first wiring line group that is disposed on one end side of a peripheral part, which is located on an outside of the effective display section, and that comprises wiring lines connected to odd-number-th scan lines, to which driving signals for turning on/off the display pixels on odd-number-th rows are supplied; and a second wiring line group that is disposed on the other end side of the peripheral part, and comprises wiring lines connected to even-number-th scan lines, to which driving signals for turning on/off the display pixels on even-number-th rows are supplied, the inspection device comprising: signal generating means for generating inspection signals; and signal input means for inputting the inspection signals, which are generated by the signal generating means, respectively to a first inspection wiring line that is connected to first wiring lines of the first wiring line group, to a second inspection wiring line that is connected to second wiring lines of the first wiring line group, which neighbor the first wiring lines, to a third inspection wiring line that is connected to third wiring lines of the second wiring line group, and to a fourth inspection wiring line that is connected to fourth wiring lines of the second wiring line group, which neighbor the third wiring lines.

According to a fifth aspect of the invention, there is provided a display device having a first effective display section composed of a plurality of display pixels, the display device comprising: a connection pad that is capable of connecting a second effective display section composed of a plurality of display pixels; a first wiring line group that is disposed on one end side of a peripheral part, which is located on an outside of the first effective display section, and that comprises a plurality of wiring lines, to which driving signals for turning on/off the display pixels of the first effective display section are supplied; a second wiring line group that is disposed on the other end side of the peripheral part, and comprises a plurality of wiring lines, to which driving signals for turning on/off the display pixels of the second effective display section are supplied via the connection pad; a first inspection wiring line that is connected to first wiring lines of the second wiring line group; and a second inspection wiring line that is connected to second wiring lines of the second wiring line group, which neighbor the first wiring lines.

The present invention can provide a display device, an inspection method for a display device, and an inspection device for a display device, which can exactly detect a wiring defect on a panel and can suppress a decrease in manufacturing yield.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view for explaining a first inspection method that is applicable to the liquid crystal display panel shown in FIG. 1;

FIG. 5 is a view for explaining a second inspection method that is applicable to the liquid crystal display panel shown in FIG. 1;

DETAILED DESCRIPTION OF THE INVENTION

Display devices, inspection methods for display devices and inspection devices for display devices, according to embodiments of the present invention, will now be described with reference to the accompanying drawings.

First Embodiment

Figure 1:
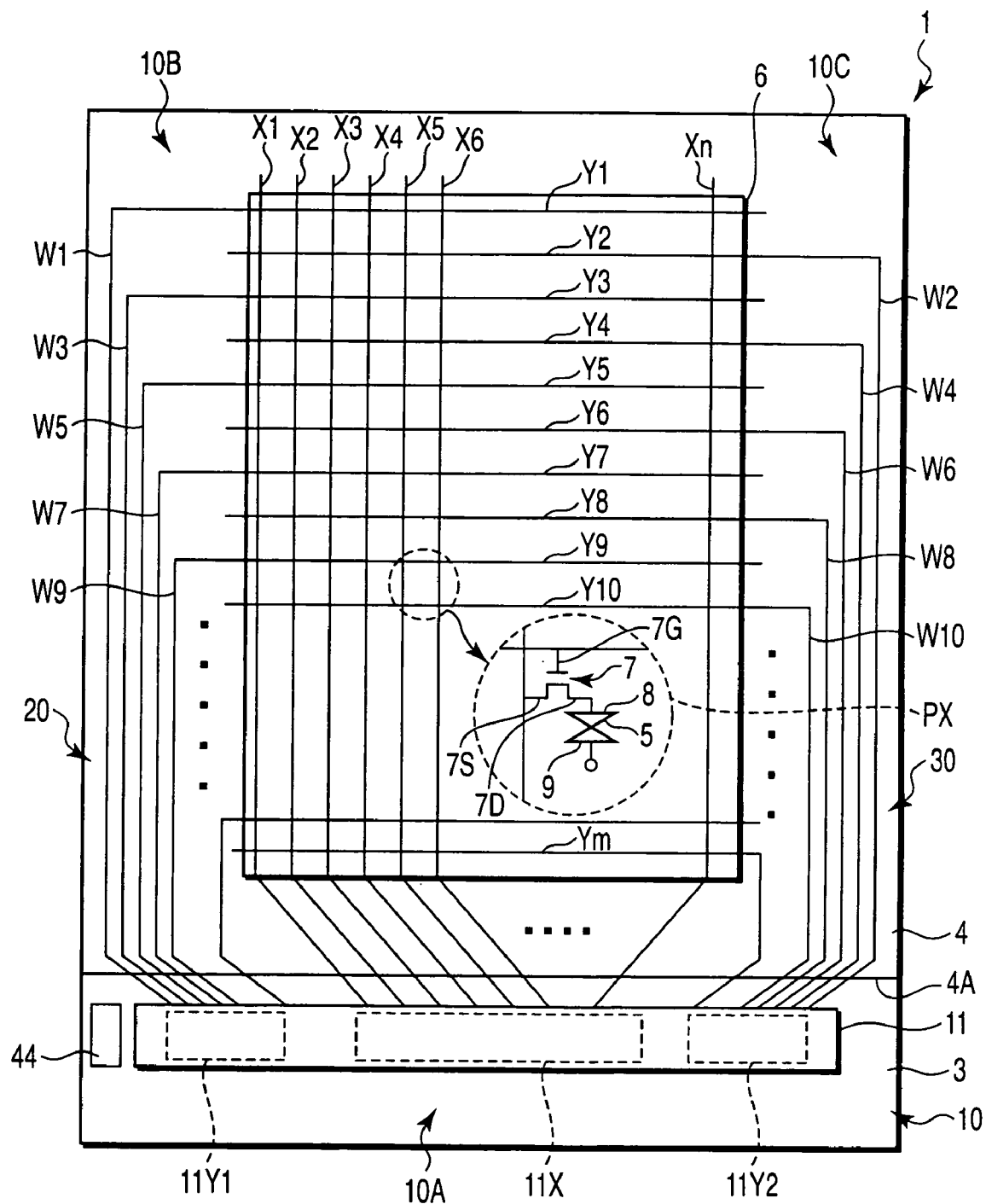
FIG. 1 schematically shows the structure of a liquid crystal display panel of a liquid crystal display device according to a first embodiment of the present invention.

As is shown in FIG. 1, a liquid crystal display device, which is an example of a display device according to a first embodiment, includes a substantially rectangular, planar liquid crystal display panel 1. The liquid crystal display panel 1 comprises a pair of substrates, that is, an array substrate 3 and a counter-substrate 4, and a liquid crystal layer 5 that is interposed as an optical modulation layer between the pair of substrates. The liquid crystal display panel 1 includes a substantially rectangular effective display section 6 that displays an image. The effective display section 6 is composed of a plurality of display pixels PX that are arranged in a matrix.

The array substrate 3 includes, in the effective display section 6, a plurality of scan lines Y ($1, 2, 3, \ldots, m$) that extend in a row direction of the display pixels PX, a plurality of signal lines X (1, 2, 3, . . . , n) that extend in a column direction of the display pixels PX, switching elements 7 that are arranged for the respective display pixels PX near intersections between scan lines Y and signal lines X, and pixel electrodes 8 that are connected to the switching elements 7.

The switching element 7 is formed of, e.g. a thin-film transistor (TFT). The switching element 7 has a gate electrode 7G that is electrically connected to the associated scan line Y (or formed integral with the scan line). The switching element 7 has a source electrode 7S that is electrically connected to the associated signal line X (or formed integral with the signal line). The switching element 7 has a drain electrode 7D that is electrically connected to the pixel electrode 8 of the associated display pixel PX.

The counter-substrate 4 includes a counter-electrode 9 that is common to all the display pixels PX in the effective display section 6. The array substrate 3 and counter-substrate 4 are disposed such that the pixel electrodes 8 are opposed to the counter-electrode 9, and a gap is provided therebetween. The liquid crystal layer 5 is formed of a liquid crystal composition that is sealed in the gap between the array substrate 3 and counter-substrate 4.

In a color display type liquid crystal display device, the liquid crystal display panel 1 includes a plurality of kinds of display pixels, for instance, a red pixel that displays red (R), a green pixel that displays green (G), and a blue pixel that displays blue (B). Specifically, the red pixel includes a red color filter that passes light with a principal wavelength of red. The green pixel includes a green color filter that passes light with a principal wavelength of green. The blue pixel includes a blue color filter that passes light with a principal wavelength of blue. These color filters are disposed on a major surface of the array substrate 3 or counter-substrate 4.

The liquid crystal display panel 1 includes a driving IC chip 11 that is disposed on a peripheral part 10 on the outside of the effective display section 6. In the example shown in FIG. 1, the driving IC chip 11 is disposed on an extension part 10A of the array substrate 3, which extends outward beyond an end portion 4A of the counter-substrate 4. The driving IC chip 11 includes a signal line driving section 11X that supplies driving signals (video signals) to the signal lines X, and a scan line driving section 11Y that supplies driving signals (scan signals) to the scan lines Y.

The scan line driving section 11Y includes a first driving unit 11Y1 that outputs driving signals to odd-number-th scan lines Y (1, 3, 5, . . . ), and a second driving unit 11Y2 that outputs driving signals to even-number-th scan lines Y (2, 4, 6, . . . ). The first driving unit 11Y1 and second driving unit 11Y2 are disposed on both sides of the signal line driving section 11X so as to sandwich the signal line driving section 11X.

To be more specific, the first driving unit 11Y1 is electrically connected to the odd-number-th scan lines Y (1, 3, 5, . . . ) via a first wiring line group 20 that is disposed on one end side 10B of the peripheral part 10. The first wiring line group 20 comprises wiring lines W (1, 3, 5, . . . ) that are connected to the odd-number-th scan lines Y (1, 3, 5, . . . ). Driving signals that are output from the first driving unit 11Y1 are supplied via the wiring lines W (1, 3, 5, . . . ) to the associated odd-number-th scan lines Y (1, 3, 5, . . . ), thereby turning on/off the display pixels PX on the odd-number-th rows. That is, the switching element 7 that is included in each display pixel PX is ON/OFF controlled on the basis of the driving signal that is supplied from the associated scan line Y.

The second driving unit 11Y2 is electrically connected to the even-number-th scan lines Y (2, 4, 6, . . . ) via a second wiring line group 30 that is disposed on the other end side 10C of the peripheral part 10. The second wiring line group 30 comprises wiring lines W (2, 4, 6, . . . ) that are connected to the even-number-th scan lines Y (2, 4, 6, . . . ). Driving signals that are output from the second driving unit 11Y2 are supplied via the wiring lines W (2, 4, 6, . . . ) to the associated even-number-th scan lines Y (2, 4, 6, . . . ), thereby turning on/off the display pixels PX on the even-number-th rows.

Figure 2:
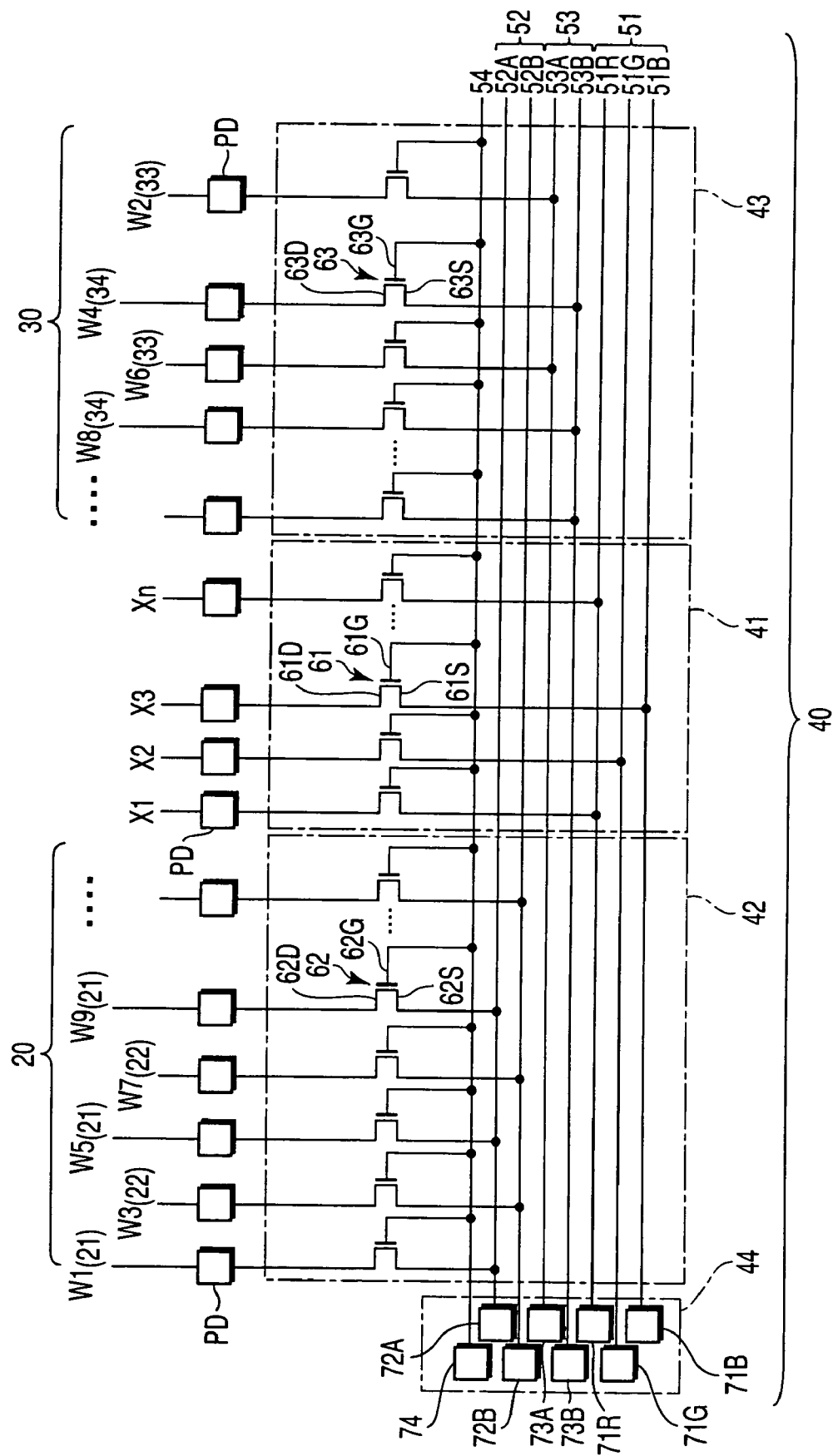
FIG. 2 schematically shows the structure of an inspection wiring line section of the liquid crystal display panel shown in FIG. 1.

As is shown in FIG. 2, the array substrate 3 includes an inspection wiring line section 40 for inspecting a wiring defect between the lines of the first wiring line group 20 and a wiring defect between the lines of the second wiring line group 30 on the peripheral part 10, and a wiring defect in the effective display section 6. The inspection wiring line section 40 includes a signal line inspection section 41 that is provided in association with the signal line driving section 11X, a first scan line inspection section 42 that is provided in association with the first driving unit 11Y1 of the scan line driving section 11Y, a second scan line inspection section 43 that is provided in association with the second driving unit 11Y2 of the scan line driving section 11Y, and a pad section 44 for inputting various signals to the respective inspection sections 41, 42 and 43.

The signal line inspection section 41 includes signal line inspection wiring lines 51 that are connected to the associated signal lines X. In this example, the signal line inspection wiring lines 51 comprise a red inspection wiring line 51R for supplying an inspection signal to the signal line connected to the red pixel, a green inspection wiring line 51G for supplying an inspection signal to the signal line connected to the green pixel, and a blue inspection wiring line 51B for supplying an inspection signal to the signal line connected to the blue pixel.

The signal line inspection section 41 also includes switch elements 61 between the signal lines X (1, 2, . . . , n) and the signal line inspection wiring lines 51 (R, G, B). Each of the switch elements 61 is composed of a thin-film transistor. A gate electrode 61G of the switch element 61 is electrically connected to a common switching signal line 54. A source electrode 61S of the switch element 61 is electrically connected to the associated signal line inspection wiring line 51 (R, G, B). A drain electrode 61D of the switch element 61 is electrically connected to the associated signal line X.

The first scan line inspection section 42 includes a first inspection wiring line 52A that is connected to first wiring lines 21, for instance, wiring lines W1, W5, W9, . . . , of the first wiring line group 20, and a second inspection wiring line 52B that is connected to second wiring lines 22, for instance, wiring lines W3, W7, W11, . . . , which neighbor the first wiring lines 21.

The first scan line inspection section 42 includes switch elements 62 between the first wiring lines 21 and the first inspection wiring lines 52A, and similar switch elements 62 between the second wiring lines 22 and the second inspection wiring lines 52B. These switch elements 62 are composed of thin-film transistors.

Specifically, a gate electrode 62G of the switch element 62 is electrically connected to the common switching signal line 54. A source electrode 62S of the switch element 62 is electrically connected to the associated first inspection wiring line 52A or second inspection wiring line 52B. A drain electrode 62D of the switch element 62 is electrically connected to the associated first wiring line 21 or second wiring line 22.

The second scan line inspection section 43 includes a third inspection wiring line 53A that is connected to third wiring lines 33, for instance, wiring lines W2, W6, W10, . . . , of the second wiring line group 30, and a fourth inspection wiring line 53B that is connected to fourth wiring lines 34, for instance, wiring lines W4, W8, W12, . . . , which neighbor the third wiring lines 33.

The second scan line inspection section 43 includes switch elements 63 between the third wiring lines 33 and the third inspection wiring lines 53A, and similar switch elements 63 between the fourth wiring lines 34 and the fourth inspection wiring lines 53B. These switch elements 63 are composed of thin-film transistors.

Specifically, a gate electrode 63G of the switch element 63 is electrically connected to the common switching signal line 54. A source electrode 63S of the switch element 63 is electrically connected to the associated third inspection wiring line 53A or fourth inspection wiring line 53B. A drain electrode 63D of the switch element 63 is electrically connected to the associated third wiring line 33 or fourth wiring line 34.

The pad section 44 includes input pads 71 (R, G, B), each of which enables input of a driving signal to one end of the associated signal line inspection wiring line 51 (R, G, B), input pads 72A, 72B, 73A and 73B, each of which enables input of a driving signal to one end of the associated one of the first to fourth inspection wiring lines 52A, 52B, 53A and 53B, and an input pad 74 that enables input of a driving signal to one end of the switching signal line 54.

The driving signals that are input from the input pads 71 (R, G, B) are inspection video signals that are written in the pixel electrodes 8 of the display pixels PX at a stage of inspections. The driving signals that are input from the input pads 72A, 72B, 73A and 73B are inspection signals for ON/OFF controlling the switching elements 7 of the display pixels PX at a stage of inspections. The driving signal that is input from the input pad 74 is a switching signal for ON/OFF controlling the switch elements 61, 62 and 63 of the respective inspection sections at a stage of inspections.

The signal lines X (1, 2, . . . , n), the wiring lines 21, 22 of the first wiring line group 20 and the wiring lines 33, 34 of the second wiring line group 30 include connection pads PD at their intermediate portions, which enable connection to the driving IC chip 11.

The liquid crystal display device with the above-described structure has such a layout that driving signals can be supplied to the odd-number-th scan lines and even-number-th scan lines from both end sides of the effective display section. In this layout, it is possible to input individual inspection signals to the first wiring lines and neighboring second wiring lines of the first wiring line group for supplying driving signals to the odd-number-th scan lines, and to input individual inspection signals to the third wiring lines and neighboring fourth wiring lines of the second wiring line group for supplying driving signals to the even-number-th scan lines. It is thus possible to exactly detect wiring defects on the panel, such as short-circuit between the wiring lines of the first wiring line group or line breakage of each wiring line, and short-circuit between the wiring lines of the second wiring line group or line breakage of each wiring line.

The signal line inspection section 41, first scan line inspection section 42 and second scan line inspection section 43 are disposed on the extension part 10A of the array substrate 3 at a position corresponding to a region where the driving IC chip 11 is disposed. Needless to say, the first to fourth inspection wiring lines 52A, 52B, 53A and 53B are disposed on the extension part 10A. The first to fourth inspection wiring lines 52A, 52B, 53A and 53B extend in a longitudinal direction of the driving IC chip 11. Thus, the first to fourth inspection wiring lines 52A, 52B, 53A and 53B overlap the driving IC chip 11 when the driving IC chip 11 is mounted. In short, the inspection wiring lines can be disposed on the array substrate without increasing the outer dimensions.

(Inspection Device)

Figure 3:
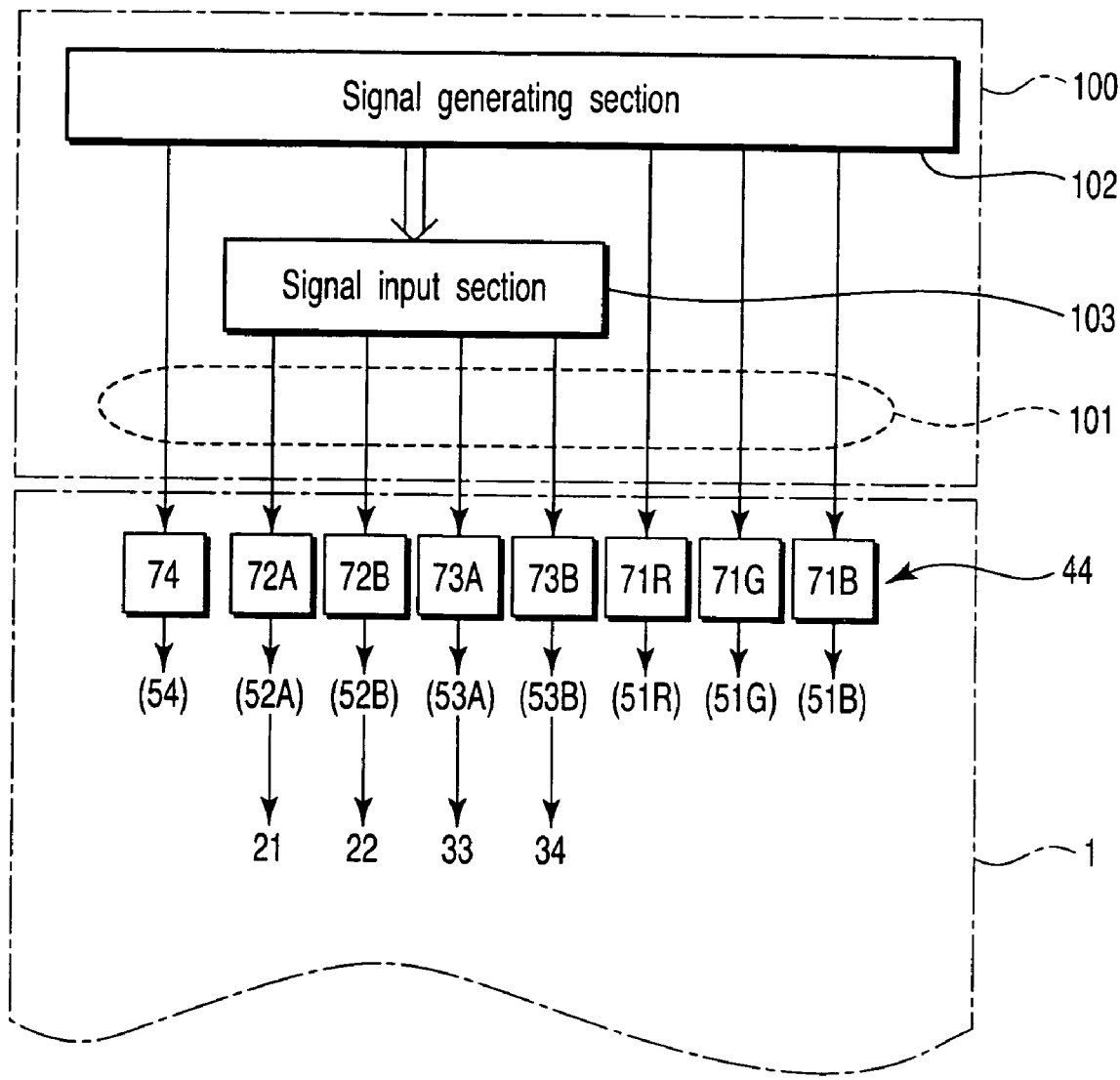
FIG. 3 schematically shows the structure of an inspection device that is applicable to the liquid crystal display panel shown in FIG. 1.

Next, a description is given of an inspection device 100 according to the first embodiment that detects a wiring defect on the liquid crystal display panel in the liquid crystal display device having the above-described structure. As is shown in FIG. 3, the inspection device 100 includes a plurality of probes 101 that can be connected to the input pads of the pad section 44, a signal generating section 102 that generates various signals including inspection signals that are to be input to the first to fourth inspection wiring lines via the probes 101, and a signal input section 103 that inputs the various signals, which are generated by the signal generating section 102, to the first to fourth inspection wiring lines.

(First Inspection Method)

Next, a description is given of a first inspection method according to the first embodiment for detecting a wiring defect on the liquid crystal display panel in the liquid crystal display device with the above-described structure. The first inspection method is executed in a process step after the formation of the liquid crystal display panel 1 and before the mounting of the driving IC chip 11 on the liquid crystal display panel 1. In an inspection device 100 that is applied to the first inspection method, the signal generating section 102 generates independent four kinds of inspection signals, that is, a first inspection signal, a second inspection signal, a third inspection signal and a fourth inspection signal. In the meantime, the four kinds of inspection signals may be different signals, or at least two of them may be the same signal. In addition, at least one of the four kinds of inspection signals may be an inspection signal that is constantly in an OFF level during the inspection step.

Specifically, in the first inspection method, the probes 101 of the inspection device 100 are connected to the input pads of the pad section 44 of the liquid crystal display panel 1. At a predetermined timing, the signal generating section 102 inputs a switching signal to the switching signal line 54. By the input of the switching signal, the switch elements 61 of the signal line inspection section 41, the switch elements 62 of the first scan line inspection section 42 and the switch elements 63 of the second scan line inspection section 43 are turned on at proper timings.

Upon turning on of the switch elements 62, the signal input section 103 inputs the first inspection signal to the first inspection wiring line 52A that is connected to the first wiring lines 21 of the first wiring line group 20, and inputs the second inspection signal to the second inspection wiring line 52B that is connected to the second wiring lines 22 of the first wiring line group 20. Thereby, the first inspection signal or second inspection signal is supplied via the first wiring line group 20 to the odd-number-th scan lines. By the input of the first inspection signal and second inspection signal, the switching elements 7 that are connected to the odd-number-th scan lines in the effective display section 6 are turned on at proper timings.

Upon turning on of the switch elements 63, the signal input section 103 inputs the third inspection signal to the third inspection wiring line 53A that is connected to the third wiring lines 33 of the second wiring line group 30, and inputs the fourth inspection signal to the fourth inspection wiring line 53B that is connected to the fourth wiring lines 34 of the second wiring line group 30. Thereby, the third inspection signal or fourth inspection signal is supplied via the second wiring line group 30 to the even-number-th scan lines. By the input of the third inspection signal and fourth inspection signal, the switching elements 7 that are connected to the even-number-th scan lines in the effective display section 6 are turned on at proper timings.

Subsequently, on the basis of the input of the first to fourth inspection signals, short-circuit between the first wiring line 21 and second wiring line 22 of the first wiring line group 20, short-circuit between the third wiring line 33 and fourth wiring line 34 of the second wiring line group 30, and short-circuit between the odd-number-th scan line and even-number-th scan line in the effective display section 6 are inspected. In the first inspection method, in this inspection step, the signal generating section 102 inputs the inspection video signals to the respective signal lines X via the signal line inspection wiring lines 51 (R, G, B) in the state in which the switching elements 7 in the effective display section 6 are turned on. Thereby, the inspection video signals are written in the display pixels PX in the effective display section 6 of the liquid crystal display panel 1. By the write of the inspection video signals, wiring defects of the various wiring lines on the liquid crystal display panel 1 are checked.

Specifically, as shown in FIG. 4, at a timing when signals can be input to the associated odd-number-th scan lines from the first wiring lines 21 of the first wiring line group 20, the first inspection signal is input from the first inspection wiring line 52A and the inspection video signals are input to the respective signal lines X. In this case, if short-circuit occurs between the neighboring first wiring line 21 and second wiring line 22 in the first wiring line group 20, for example, if short-circuit occurs between the wiring line W1 and wiring line W3, the first inspection signal is supplied not only to the scan line Y1, which is connected to the wiring line W1, but also to the scan line Y3, which is connected to the wiring line W3. Consequently, the switching elements 7 of the display pixels PX that are connected to the scan line Y3, as well as the switching elements 7 of the display pixels PX that are connected to the scan line Y1, are turned on at the same time. In a normal case, the switching elements 7 of the display pixels PX, which are connected to the scan lines Y1, Y5, Y9, . . . , are to be turned on. However, due to the short-circuit between the wiring lines W1 and W3, the switching elements 7 of the display pixels PX, which are connected to the scan lines Y1, Y3, Y5 and Y9, . . . , are turned on.

In this way, if the inspection video signals are supplied in the state in which the respective switching elements 7 are turned on, the associated display pixels PX on the liquid crystal display panel 1 are turned on. By observing the turn-on states of the display pixels PX on the liquid crystal display panel 1, short-circuit between the first wiring line 21 and second wiring line 22 in the first wiring line group 20 can be checked.

Similarly, at a timing when signals can be input to the associated odd-number-th scan lines from the second wiring lines 22 of the first wiring line group 20, the second inspection signal is input from the second inspection wiring line 52B and the inspection signals are input to the respective signal lines X. Thereby, short-circuit between the first wiring line 21 and second wiring line 22 in the first wiring line group 20 can be checked.

In addition, as shown in FIG. 4, at a timing when signals can be input to the associated even-number-th scan lines from the third wiring lines 33 of the second wiring line group 30, the third inspection signal is input from the third inspection wiring line 53A and the inspection video signals are input to the respective signal lines X. In this case, if short-circuit occurs between the neighboring third wiring line 33 and fourth wiring line 34 in the second wiring line group 30, for example, if short-circuit occurs between the wiring line W2 and wiring line W4, the third inspection signal is supplied not only to the scan line Y2, which is connected to the wiring line W2, but also to the scan line Y4, which is connected to the wiring line W4. Consequently, the switching elements 7 of the display pixels PX that are connected to the scan line Y4, as well as the switching elements 7 of the display pixels PX that are connected to the scan line Y2, are turned on at the same time. In a normal case, the switching elements 7 of the display pixels PX, which are connected to the scan lines Y2, Y6, Y10, . . . , are to be turned on. However, due to the short-circuit between the wiring lines W2 and W4, the switching elements 7 of the display pixel PX, which are connected to the scan lines Y2, Y4, Y6 and Y10, . . . , are turned on. Thus, short-circuit between the third wiring line 33 and fourth wiring line 34 in the second wiring line group 30 can be checked.

Similarly, at a timing when signals can be input to the associated even-number-th scan lines from the fourth wiring lines 34 of the second wiring line group 30, the fourth inspection signal is input from the fourth inspection wiring line 53B and the inspection signals are input to the respective signal lines X. Thereby, short-circuit between the third wiring line 33 and fourth wiring line 34 in the second wiring line group 30 can be checked.

Besides, it is possible to inspect short-circuit between the odd-number-th scan line and the even-number-th scan line in the effective display section 6, at the same time as the inspection of short-circuit in the first wiring line group 20 and second wiring line group 30. Assume now that short-circuit occurs between the odd-number-th scan line and even-number-th scan line, for example, short-circuit occurs between the scan line Y1 and scan line Y2. In this case, if the first inspection signal is input from the first wiring line 21 to the associated odd-number-th scan line in the step of inspecting short-circuit between the first wiring line 21 and second wiring line 22 of the first wiring line group 20, the first inspection signal is supplied to the scan line Y1 and the scan line Y3. Consequently, the switching elements 7 of the display pixels PX that are connected to the scan line Y2, as well as the switching elements 7 of the display pixels PX that are connected to the scan line Y1, are turned on at the same time. In a normal case, the switching elements 7 of the display pixels PX, which are connected to the scan lines Y1, Y5, Y9, . . . , are to be turned on. However, due to the short-circuit between the scan line Y1 and scan line Y2, the switching elements 7 of the display pixels PX, which are connected to the scan lines Y1, Y2, Y5 and Y9, are turned on.

In this way, if the inspection video signals are supplied to the signal lines X in the state in which the respective switching elements 7 are turned on, the associated display pixels PX on the liquid crystal display panel 1 are turned on. By observing the turn-on states of the display pixels PX on the liquid crystal display panel 1, short-circuit between the neighboring scan lines can be checked.

Furthermore, according to the above-described first inspection method, in addition to the inspection of short-circuit between wiring lines, it is also possible to inspect line breakage between the connection pad PD, which enables connection to the driving IC chip 11, and the terminal end of each wiring line, by observing the turn-on state of the display pixel PX on the liquid crystal display panel 1. Specifically, on the basis of the input of the various inspection signals, the turn-on state of the display pixels PX is observed. Thereby, it is possible to inspect line breakage between the first wiring line 21 and second wiring line 22 of the first wiring line group 20, line breakage between the third wiring line 33 and fourth wiring line 34 of the second wiring line group 30, and line breakage occurring at a point over the length to the terminal ends of the scan lines Y and signal lines X in the effective display section 6 (if line breakage occurs, the associated display pixel PX is not turned on).

As has been described above, according to the first inspection method, in the liquid crystal display device with such a layout that driving signals can be supplied to the odd-number-th scan lines and even-number-th scan lines from both end sides of the effective display section, the inspection device generates the four kinds of inspection signals, inputs the first inspection signal to the first wiring lines of the first wiring line group, and inputs the second inspection signal to the second wiring lines that neighbor the first wiring lines. Based on the input of the inspection signals, it is possible to exactly detect a wiring defect in the first wiring line group and a wiring defect in the second wiring line group. At the same time, it is possible to exactly detect wiring defects such as short-circuit between the odd-number-th scan line and even-number-th scan line in the effective display section, and line breakage of the scan line and the signal line. Thus, it is possible to prevent a liquid crystal display panel with a wiring defect from going to a subsequent fabrication step, and to suppress a decrease in manufacturing yield.

(Second Inspection Method)

Next, a description is given of a second inspection method according to the first embodiment for detecting a wiring defect on the liquid crystal display panel in the liquid crystal display device with the above-described structure. Like the first inspection method, the second inspection method is executed in a process step after the formation of the liquid crystal display panel 1 and before the mounting of the driving IC chip 11 on the liquid crystal display panel. In an inspection device 100 that is applied to the second inspection method, the signal generating section 102 generates independent two kinds of inspection signals, that is, a first inspection signal and a second inspection signal. In the meantime, the two kinds of inspection signals may be different signals, or two of them may be the same signal. In addition, one of the two kinds of inspection signals may be an inspection signal that is constantly in an OFF level during the inspection step.

Specifically, in the second inspection method, the probes 101 of the inspection device 100 are connected to the input pads of the pad section 44 of the liquid crystal display panel 1. At a predetermined timing, the signal generating section 102 inputs a switching signal to the switching signal line 54. By the input of the switching signal, the switch elements 61 of the signal line inspection section 41, the switch elements 62 of the first scan line inspection section 42 and the switch elements 63 of the second scan line inspection section 43 are turned on at proper timings.

In a first inspection step, upon turning on of the switch elements 62, the signal input section 103 inputs the first inspection signal to the first inspection wiring line 52A that is connected to the first wiring lines 21 of the first wiring line group 20 and to the second inspection wiring line 52B that is connected to the second wiring lines 22 of the first wiring line group 20. Thereby, the first inspection signal is supplied via the first wiring line group 20 to the odd-number-th scan lines. By the input of the first inspection signal, the switching elements 7 that are connected to the odd-number-th scan lines in the effective display section 6 are turned on at proper timings.

Upon turning on of the switch elements 63, the signal input section 103 inputs the second inspection signal to the third inspection wiring line 53A that is connected to the third wiring lines 33 of the second wiring line group 30, and to the fourth inspection wiring line 53B that is connected to the fourth wiring lines 34 of the second wiring line group 30. Thereby, the second inspection signal is supplied via the second wiring line group 30 to the even-number-th scan lines. By the input of the second inspection signal, the switching elements 7 that are connected to the even-number-th scan lines in the effective display section 6 are turned on at proper timings.

Subsequently, on the basis of the input of the first and second inspection signals, short-circuit between the odd-number-th scan line and the even-number-th scan line in the effective display section 6 is inspected.

Then, in a second inspection step, upon turning on of the switch elements 62, the signal input section 103 inputs the first inspection signal to the first inspection wiring line 52A and to the third inspection wiring line 53A. Thereby, the first inspection signal is supplied via the first wiring line 21 of the first wiring line group 20 to the odd-number-th scan lines, and also supplied via the third wiring line 33 of the second wiring line group 30 to the even-number-th scan lines. By the input of the first inspection signal, the switching elements 7 that are connected to the odd-number-th scan lines and even-number-th scan lines in the effective display section 6 are turned on at proper timings.

In addition, upon turning on of the switch elements 63, the signal input section 103 inputs the second inspection signal to the second inspection wiring line 52B and to the fourth inspection wiring line 53B. Thereby, the second inspection signal is supplied via the second wiring line 22 of the first wiring line group 20 to the odd-number-th scan lines, and also supplied via the fourth wiring line 34 of the second wiring line group 30 to the even-number-th scan lines. By the input of the second inspection signal, the switching elements 7 that are connected to the odd-number-th scan lines and even-number-th scan lines in the effective display section 6 are turned on at proper timings.

Subsequently, on the basis of the input of the first and second inspection signals, short-circuit between the first wiring line 21 and second wiring line 22 of the first wiring line group 20 and short-circuit between the third wiring line 33 and fourth wiring line 34 of the second wiring line group 30 are inspected. In the first inspection step and second inspection step in the second inspection method, the signal generating section 102 inputs the inspection video signals to the respective signal lines X via the signal line inspection wiring lines 51 (R, G, B) in the state in which the switching elements 7 in the effective display section 6 are turned on. Thereby, the inspection video signals are written in the display pixels PX in the effective display section 6 of the liquid crystal display panel 1. By the write of the inspection video signals, short-circuit between wiring lines on the liquid crystal display panel 1 is checked.

Specifically, as shown in FIG. 5, in the first inspection step, at a timing when signals can be input to the associated odd-number-th scan lines from the first wiring lines 21 and second wiring lines 22 of the first wiring line group 20, the first inspection signal is input and the inspection video signals are input to the respective signal lines X. In a case where short-circuit occurs between the odd-number-th scan line and even-number-th scan line, for example, in a case where short-circuit occurs between the scan line Y1 and scan line Y2, if the first inspection signal is supplied from the first wiring lines 21 and second wiring lines 22 to the associated odd-number-th scan lines, the first inspection signal is supplied not only to the odd-number-th scan lines Y1, Y3, Y5, . . . , but also to the scan line Y2. Consequently, the switching elements 7 of the display pixels PX that are connected to the scan line Y2, as well as the switching elements 7 of the display pixels PX that are connected to the odd-number-th scan lines, are turned on at the same time. In a normal case, the switching elements 7 of the display pixels PX, which are connected to the scan lines Y1, Y3, Y5, ..., are to be turned on. However, due to the short-circuit between the scan line Y1 and scan line Y2, the switching elements 7 of the display pixels PX, which are connected to the scan lines Y1, Y2, Y3, Y5, ..., are turned on.

In this way, if the inspection video signals are supplied to the signal lines X in the state in which the respective switching elements 7 are turned on, the associated display pixels PX on the liquid crystal display panel 1 are turned on. By observing the turn-on states of the display pixels PX on the liquid crystal display panel 1, short-circuit between neighboring scan lines in the effective display section 6 can be checked.

Similarly, at a timing when signals can be input to the associated even-number-th scan lines from the third wiring lines 33 and fourth wiring lines 34 of the second wiring line group 30, the second inspection signal is input and the inspection video signals are input to the respective signal lines X. Thereby, short-circuit between neighboring scan lines in the effective display section 6 can be checked.

In addition, as shown in FIG. 5, in the second inspection step, at a timing when signals can be input to the associated scan lines from the first wiring lines 21 of the first wiring line group 20 and the third wiring lines 33 of the second wiring line group 30, the first inspection signal is input and the inspection video signals are input to the respective signal lines X.

In a case where short-circuit occurs between the neighboring first wiring line 21 and second wiring line 22 in the first wiring line group 20, for example, in a case where short-circuit occurs between the wiring line W1 and wiring line W3, the first inspection signal is supplied not only to the scan line Y1 that is connected to the wiring line W1, but also to the scan line Y3 that is connected to the wiring line W3. Consequently, the switching elements 7 of the display pixels PX that are connected to the scan line Y3, as well as the switching elements 7 of the display pixels PX that are connected to the scan line Y1, are turned on at the same time. In a normal case, the switching elements 7 of the display pixels PX, which are connected to the scan lines Y1, Y5, Y9, ..., are to be turned on. However, due to the short-circuit between the wiring line W1 and wiring line W3, the switching elements 7 of the display pixels PX, which are connected to the scan lines Y1, Y3, Y5, Y9, ..., are turned on. Thereby, short-circuit between the first wiring line 21 and second wiring line 22 of the first wiring line group 20 can be checked.

In addition, in a case where short-circuit occurs between the neighboring third wiring line 33 and fourth wiring line 34 in the second wiring line group 30, for example, in a case where short-circuit occurs between the wiring line W2 and wiring line W4, the first inspection signal is supplied not only to the scan line Y2 that is connected to the wiring line W2, but also to the scan line Y4 that is connected to the wiring line W4. Consequently, the switching elements 7 of the display pixels PX that are connected to the scan line Y4, as well as the switching elements 7 of the display pixels PX that are connected to the scan line Y2, are turned on at the same time. In a normal case, the switching elements 7 of the display pixels PX, which are connected to the scan lines Y2, Y6, Y10, ..., are to be turned on. However, due to the short-circuit between the wiring line W2 and wiring line W4, the switching elements 7 of the display pixels PX, which are connected to the scan lines Y2, Y4, Y6, Y10, ..., are turned on. Thereby, short-circuit between the third wiring line 33 and fourth wiring line 34 of the second wiring line group 30 can be checked.

Similarly, at a timing when signals can be input to the associated scan lines from the second wiring lines 22 of the first wiring group 20 and the fourth wiring lines 34 of the second wiring line group 30, the second inspection signal is input and the inspection video signals are input to the respective signal lines X. Thereby, short-circuit between the first wiring line 21 and second wiring line 22 of the first wiring line group 20 and short-circuit between the third wiring line 33 and fourth wiring line 34 of the second wiring line group 30 can be checked.

Furthermore, according to the above-described second inspection method, in addition to the inspection of short-circuit between wiring lines, it is also possible to inspect line breakage between the connection pad PD, which enables connection to the driving IC chip 11, and the terminal end of each wiring line, by observing the turn-on states of the display pixels PX on the liquid crystal display panel 1. Specifically, on the basis of the input of the various inspection signals, the turn-on states of the display pixels PX are observed. Thereby, it is possible to inspect line breakage between the first wiring line 21 and second wiring line 22 of the first wiring line group 20, line breakage between the third wiring line 33 and fourth wiring line 34 of the second wiring line group 30, and line breakage occurring at a point over the length to the terminal ends of the scan lines Y and signal lines X in the effective display section 6 (if line breakage occurs, the associated display pixel PX is not turned on).

As has been described above, according to the second inspection method, in the liquid crystal display device with such a layout that driving signals can be supplied to the odd-number-th scan lines and even-number-th scan lines from both end sides of the effective display section, the inspection device generates the two kinds of inspection signals. In the first inspection step, the inspection device inputs the first inspection signal to the first wiring lines and second wiring lines of the first wiring line group, and inputs the second inspection signal to the third wiring lines and fourth wiring lines of the second wiring line group. Based on the input of the inspection signals, it is possible to exactly detect wiring defects such as short-circuit between the odd-number-th scan line and even-number-th scan line in the effective display section, and line breakage of the scan line and the signal line. In addition, in the second inspection step, the inspection device inputs the first inspection signal to the first wiring lines and third wiring lines, and inputs the second inspection signal to the second wiring lines and fourth wiring lines. Based on the input of the inspection signals, it is possible to exactly detect wiring defects in the first wiring line group and second wiring line group. Thus, it is possible to prevent a liquid crystal display panel with a wiring defect from going to a subsequent fabrication step, and to suppress a decrease in manufacturing yield.

The second inspection method requires the two steps: the step of inspecting a wiring defect between neighboring scan lines in the effective display section, and the step of inspecting a wiring defect between wiring lines that constitute the wiring groups disposed on the outside of the effective display section. However, with the provision of an inspection device that can generate two kinds of inspection signals, the cost of the inspection device can advantageously be reduced.

Second Embodiment

In the description of a second embodiment of the invention, the structural elements that are common to those in the first embodiment are denoted by like reference numerals.

Figure 6:
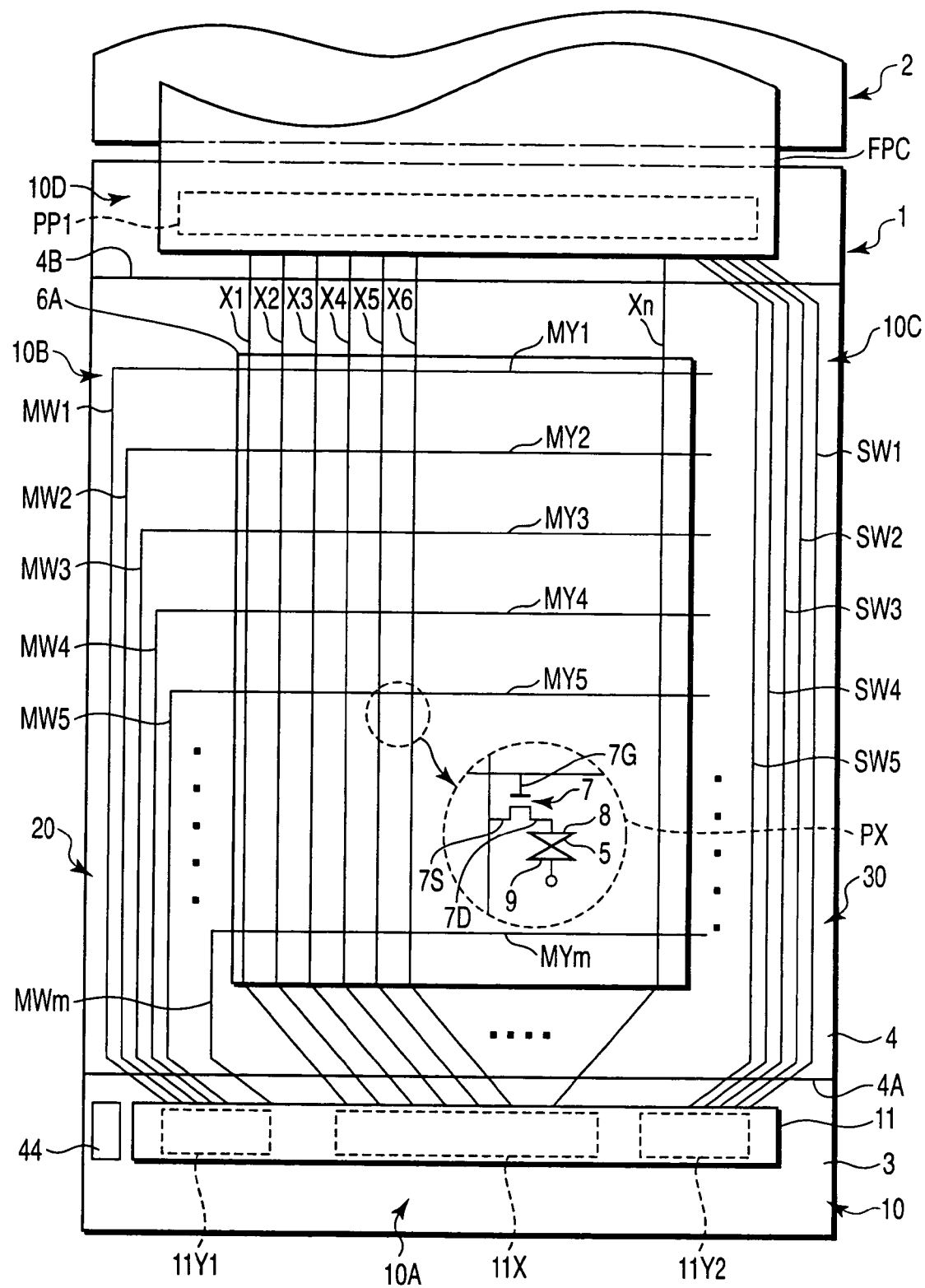
FIG. 6 schematically shows the structure of a main panel of a liquid crystal display device according to a second embodiment of the invention.

As is shown in FIG. 6, a liquid crystal display device, which is an example of a display device according to the second embodiment, includes a substantially rectangular, planar liquid crystal display panel, that is, a main panel 1. The main panel 1 comprises a pair of substrates, that is, an array substrate 3 and a counter-substrate 4, and a liquid crystal layer 5 that is interposed as an optical modulation layer between the pair of substrates. The main panel 1 includes a rectangular first effective display section 6A that displays an image. The first effective display section 6A is composed of a plurality of display pixels PX that are arranged in a matrix.

The array substrate 3 includes a plurality of scan lines MY (1, 2, 3, . . . , m) that extend in a row direction of the display pixels PX, a plurality of signal lines X (1, 2, 3, . . . , n) that extend in a column direction of the display pixels PX, switching elements 7 that are arranged for the respective display pixels PX near intersections between scan lines MY and signal lines X, and pixel electrodes 8 that are connected to the switching elements 7.

The switching element 7 is formed of, e.g. a thin-film transistor (TFT). The switching element 7 has a gate electrode 7G that is electrically connected to the associated scan line MY (or formed integral with the scan line). The switching element 7 has a source electrode 7S that is electrically connected to the associated signal line X (or formed integral with the signal line). The switching element 7 has a drain electrode 7D that is electrically connected to the pixel electrode 8 of the associated display pixel PX.

The counter-substrate 4 includes a counter-electrode 9 that is common to all the display pixels PX in the first effective display section 6A. The array substrate 3 and counter-substrate 4 are disposed such that the pixel electrodes 8 are opposed to the counter-electrode 9, and a gap is provided therebetween. The liquid crystal layer 5 is formed of a liquid crystal composition that is sealed in the gap between the array substrate 3 and counter-substrate 4.

The main panel 1 includes a driving IC chip 11 that is disposed on a peripheral part 10 on the outside of the first effective display section 6A. In the example shown in FIG. 6, the driving IC chip 11 is disposed on a first extension part 10A of the array substrate 3, which extends outward beyond an end portion 4A of the counter-substrate 4. The main panel 1 includes a connection pad section PP1 that is capable of connecting a sub-panel 2. In the example shown in FIG. 6, the connection pad section PP1 is disposed on a second extension part 10D of the array substrate 3, which extends outward beyond the other end portion 4B of the counter-substrate 4. The sub-panel 2 has basically the same structure as the main panel 1, so the common structural elements are denoted by like reference numerals and a detailed description thereof is omitted.

Figure 7:
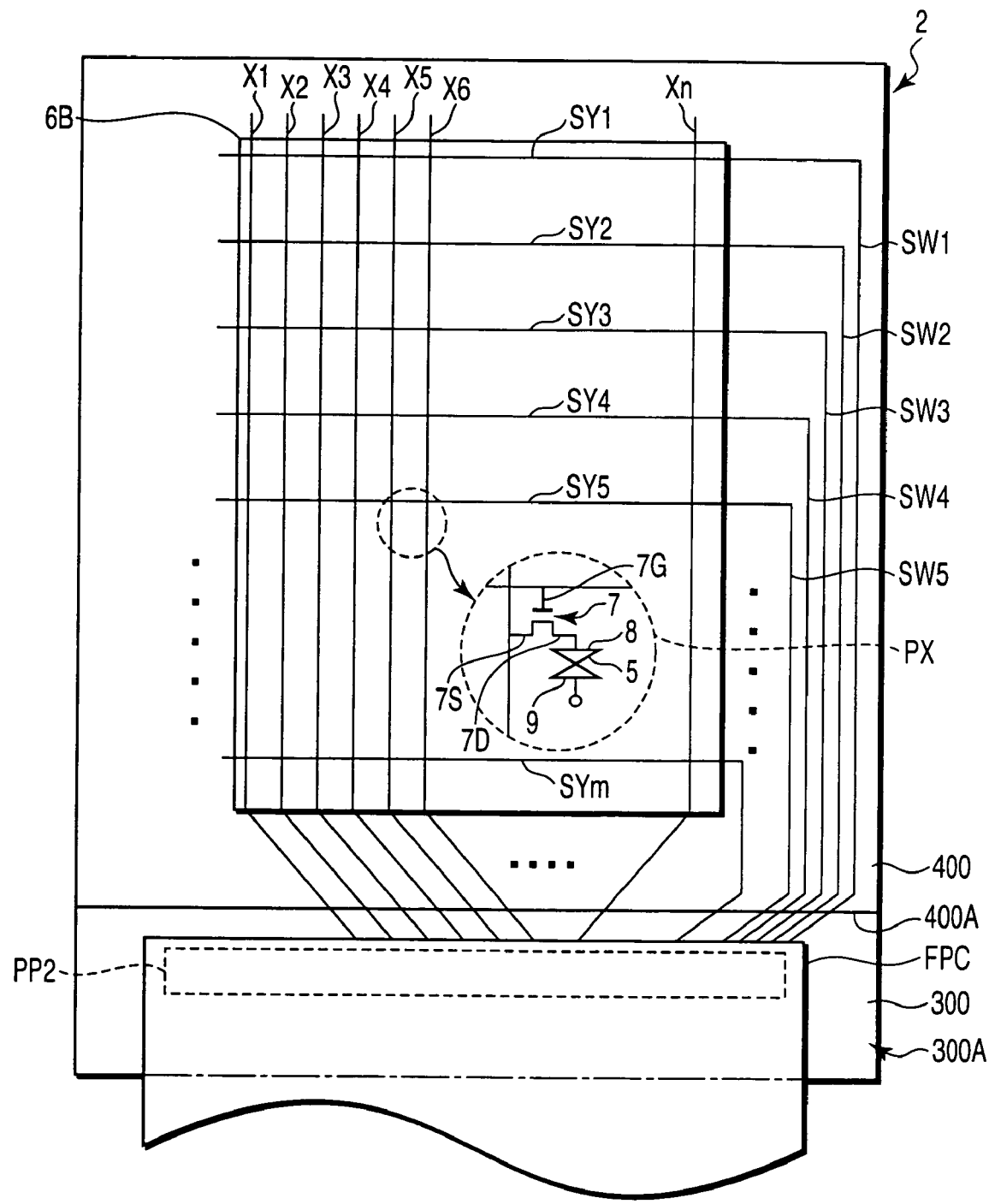
FIG. 7 schematically shows the structure of a sub-panel that is connectable to the main panel shown in FIG. 6.

As is shown in FIG. 7, the sub-panel 2 comprises a pair of substrates, that is, an array substrate 300 and a counter-substrate 400, and a liquid crystal layer 500 that is interposed as an optical modulation layer between the pair of substrates. The sub-panel 2 includes a rectangular second effective display section 6B that displays an image. The second effective display section 6B is composed of a plurality of display pixels PX that are arranged in a matrix.

The array substrate 300 includes a plurality of scan lines SY (1, 2, 3, . . . , m) that extend in a row direction of the display pixels PX, a plurality of signal lines X (1, 2, 3, . . . , n) that extend in a column direction of the display pixels PX, switching elements 7 that are arranged for the respective display pixels PX near intersections between scan lines SY and signal lines X, and pixel electrodes 8 that are connected to the switching elements 7. The switching element 7 has a gate electrode 7G that is electrically connected to the associated scan line SY (or formed integral with the scan line). The counter-substrate 400 includes, in the second effective display section 6B, a counter-electrode 9 that is common to all the display pixels PX.

The sub-panel 2 includes a connection pad section PP2 that is capable of connecting the main panel 1. In the example shown in FIG. 7, the connection pad section PP2 is disposed on an extension part 300A of the array substrate 300, which extends outward beyond an end portion 400A of the counter-substrate 400. The main panel 1 and sub-panel 2 are electrically connected via a flexible print circuit board FPC. Specifically, the flexible print circuit board FPC is connected to the connection pad section PP1 of the main panel 1 and the connection pad section PP2 of the sub-panel 2.

The driving IC chip 11, which is mounted on the main panel 1, includes a signal line driving section 11X and a scan line driving section 11Y. The signal line driving section 11X supplies driving signals (video signals) to the signal lines X on the main panel 1 and sub-panel 2. The scan line driving section 11Y includes a first driving unit 11Y1 that outputs driving signals (scan signals) to the scan lines MY of the main panel 1, and a second driving unit 11Y2 that outputs driving signals to the scan lines SY of the sub-panel 2. The first driving unit 11Y1 and second driving unit 11Y2 are disposed on both sides of the signal line driving section 11X so as to sandwich the signal line driving section 11X.

In the above-described structure, the signal lines X (1, 2, 3, . . . , n), which are disposed on the first effective display section 6A of the main panel 1, are connected to the connection pad section PP1, and the signal lines X (1, 2, 3, . . . , n), which are disposed on the second effective display section 6B of the sub-panel 2, are connected to the connection pad section PP2. The signal lines X (1, 2, 3, . . . , n), which are disposed on the first effective display section 6A, are electrically connected to the signal lines X (1, 2, 3, . . . , n), which are disposed on the second effective display section 6B, via the flexible print circuit board FPC. In this structure, the signal line driving section 11X supplies driving signals (video signals) to the signal lines X on the main panel 1 and sub-panel 2.

The first driving unit 11Y1 is electrically connected to the scan lines MY of the first effective display section 6A via a first wiring line group 20 that is disposed on one end side 10B of the peripheral part 10. The first wiring line group 20 comprises wiring lines MW (1, 2, 3, 4, . . . ) that are connected to the scan lines MY. Driving signals that are output from the first driving unit 11Y1 are supplied via the wiring lines MW (1, 2, 3, 4, . . . ) to the associated scan lines MY (1, 2, 3, 4, . . . ), thereby turning on/off the display pixels PX on the first effective display section 6A. That is, the switching element 7 that is included in each display pixel PX of the first effective display section 6A is ON/OFF controlled on the basis of the driving signal that is supplied from the associated scan line MY.

The second driving unit 11Y2 is electrically connected to the scan lines SY of the second effective display section 6B via a second wiring line group 30 that is disposed on the other end side 10C of the peripheral part 10. The second wiring line group 30 comprises wiring lines SW (1, 2, 3, 4, . . . ) that are connected to the scan lines SY. These wiring lines SW (1, 2, 3, 4, . . . ) are connected to the connection pad section PP1. On the other hand, the scan lines SY (1, 2, 3, 4, . . . ), which are disposed on the second effective display section 6B of the sub-panel 2, are connected to the connection pad section PP2. The wiring lines SW (1, 2, 3, 4, . . . ) are electrically connected to the scan lines SY (1, 2, 3, 4, . . . ) of the second effective display section 6B via the flexible print circuit board FPC.

In the above-described structure, driving signals that are output from the second driving unit 11Y2 are supplied via the wiring lines SW (1, 2, 3, 4, . . . ) to the associated scan lines SY (1, 2, 3, 4, . . . ), thereby turning on/off the display pixels PX (1, 2, 3, 4, . . . ) of the second effective display section 6B. That is, the switching element 7 that is included in each display pixel PX of the second effective display section 6B is ON/OFF controlled on the basis of the driving signal that is supplied from the associated scan line SY.

In a color display type liquid crystal display device, each of the main panel 1 and sub-panel 2 includes a plurality of kinds of display pixels, for instance, a red pixel that displays red (R), a green pixel that displays green (G), and a blue pixel that displays blue (B). Specifically, the red pixel includes a red color filter that passes light with a principal wavelength of red. The green pixel includes a green color filter that passes light with a principal wavelength of green. The blue pixel includes a blue color filter that passes light with a principal wavelength of blue. These color filters are disposed on a major surface of the array substrate or counter-substrate.

Figure 8:
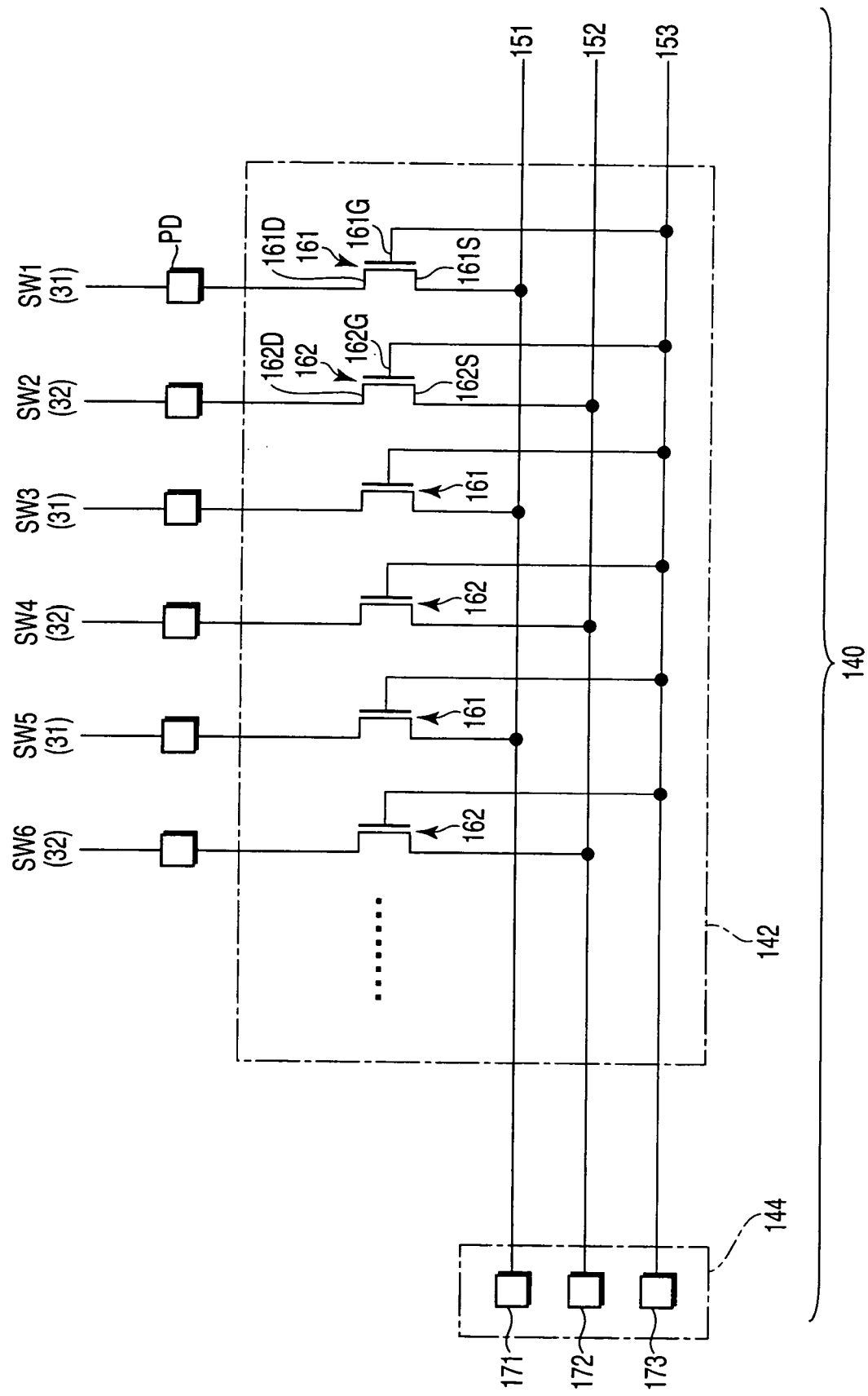
FIG. 8 schematically shows the structure of an inspection wiring line section of the main panel shown in FIG. 6.

As is shown in FIG. 8, the array substrate 3 includes an inspection wiring line section 140 for inspecting a wiring defect between the lines of the second wiring line group 30 on the peripheral part 10. The inspection wiring line section 140 includes a scan line inspection section 142 that is provided in association with the second driving unit 11Y2, and a pad section 144 for inputting various signals to the scan line inspection sections 142.

The scan line inspection section 142 includes a first inspection wiring line 151 that is connected to first wiring lines 31 of the second wiring line group 30, for instance, wiring lines SW1, SW3, SW5, . . . , and a second inspection wiring line 152 that is connected to second wiring lines 32 neighboring the first wiring lines 31, for instance, wiring lines SW2, SW4, SW6, . . . . In addition, the scan line inspection section 142 includes first switch elements 161 between the first wiring lines 31 and the first inspection wiring line 151, and second switch elements 162 between the second wiring lines 32 and the second inspection wiring line 152. The first switch elements 161 and second switch elements 162 are composed of thin-film transistors.

Specifically, a gate electrode 161G of the first switch element 161 is electrically connected to a common switching signal line 153. A drain electrode 161D of the first switch element 161 is electrically connected to the associated first wiring line 31. A source electrode 161S of the first switch element 161 is electrically connected to the associated first inspection wiring line 151.

A gate electrode 162G of the second switch element 162 is electrically connected to the common switching signal line 153. A drain electrode 162D of the second switch element 162 is electrically connected to the associated second wiring line 32. A source electrode 162S of the second switch element 162 is electrically connected to the associated second inspection wiring line 152.

The pad section 144 includes an input pad 171 that enables input of a driving signal to one end of the signal line inspection wiring line 151, an input pad 172 that enables input of a driving signal to one end of the second inspection wiring line 152, and an input 173 that enables input of a driving signal to one end of the switching signal line 153.

The driving signals that are input from the input pads 171 and 172 are inspection signals for inspecting short-circuit between the first wiring line 31 and second wiring line 32 of the second wiring group 30 at a stage of inspections. The driving signal that is input from the input pad 173 is a switching signal for ON/OFF controlling the first switch elements 161 and second switch elements 162 at a stage of inspections.

The first wiring lines 31 and second wiring lines 32 of the second wiring line group 30 include connection pads PD at their intermediate portions, which enable connection to the driving IC chip 11.

The liquid crystal display device with the above-described structure has such a layout that driving signals can be supplied to the scan lines of the first effective display section from one end side of the first effective display section, and driving signals can be supplied to the scan lines of the second effective display section from the other end side of the first effective display section. In this layout, it is possible to input different individual inspection signals at different timings to the first wiring lines and neighboring second wiring lines of the second wiring line group for supplying driving signals to the scan lines of the second effective display section. It is thus possible to exactly detect wiring defects on the panel, such as short-circuit between the wiring lines of the second wiring line group or line breakage of each wiring line.

The scan line inspection section 142 is disposed on the extension part 10A of the array substrate 3 at a position corresponding to a region where the driving IC chip 11 is disposed. Needless to say, the first and second inspection wiring lines 151 and 152 are disposed on the extension part 10A. The first and second inspection wiring lines 151 and 152 extend in a longitudinal direction of the driving IC chip 11. Thus, the first and second inspection wiring lines 151 and 152 overlap the driving IC chip 11 when the driving IC chip 11 is mounted. In short, the inspection wiring lines can be disposed on the array substrate without increasing the outer dimensions.

(Inspection Device)

Next, a description is given of an inspection device 100 for detecting a wiring defect on the liquid crystal display panel in the liquid crystal display device having the above-described structure.

An inspection device for a display device, which is applicable to the second embodiment, is as follows:

An inspection device for a display device that comprises:

a first effective display section that is composed of a plurality of display pixels;

a connection pad that is capable of connecting a second effective display section, which is composed of a plurality of display pixels; and a wiring line group that is disposed on a peripheral part on an outside of the first effective display section, and comprises a plurality of wiring lines, to which driving signals for turning on/off the display pixels of the second effective display section are supplied via the connection pad, the inspection device comprising:

signal generating means for generating an inspection signal that is input to a first inspection wiring line, which is connected to first wiring lines of the wiring line group; and detection means for detecting an output signal from a second inspection wiring line that is connected to second wiring lines, which neighbor the first wiring lines.

Figure 9:
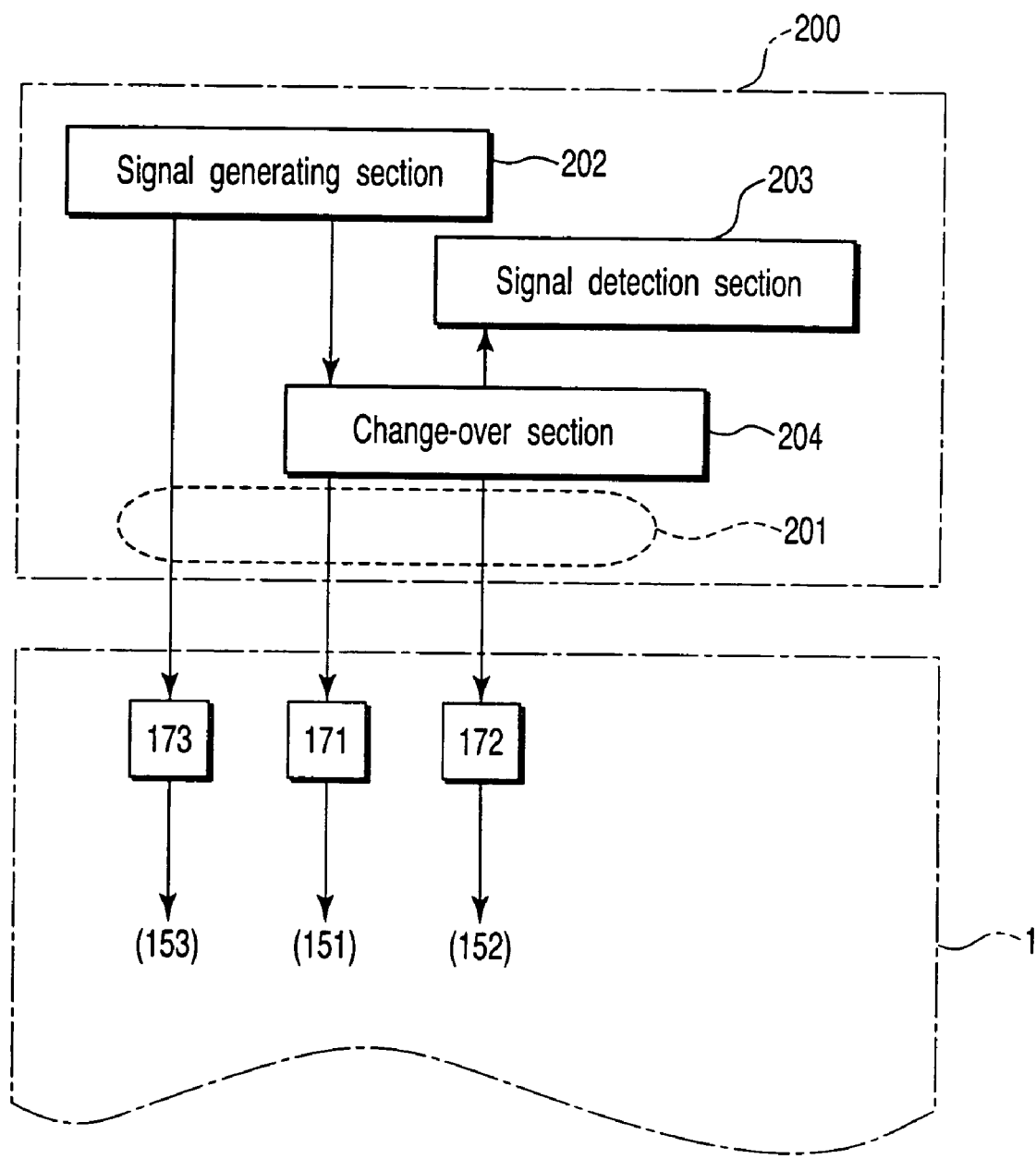
FIG. 9 schematically shows the structure of an inspection device that is applicable to the main panel shown in FIG. 6.

Specifically, an inspection device 200, as shown in FIG. 9, comprises a plurality of probes 201 that are connectable to the input pads of the pad section 144; a signal generating section 202 that generate various signals including an inspection signal, which is input to the first inspection wiring line 151 or second inspection wiring line 152 via the probes 201, and a switching signal, which is input to the switching signal line 153; a signal detection section 203 that detects an output signal, which is output via the probes 201 from the first inspection wiring line 151 or the second inspection wiring line 152; and a change-over section 204 that selectively switches the connection between the signal generating section 202 and signal detection section 203, on the one hand, and the first inspection wiring line 151 and second inspection wiring line 152, on the other hand.

(Inspection Method)

An inspection method for a display device, which is applicable to the second embodiment, is as follows:

An inspection method for a display device that comprises:

a first effective display section that is composed of a plurality of display pixels;

a connection pad that is capable of connecting a second effective display section, which is composed of a plurality of display pixels; and a wiring line group that is disposed on a peripheral part on an outside of the first effective display section, and comprises a plurality of wiring lines, to which driving signals for turning on/off the display pixels of the second effective display section are supplied via the connection pad, the inspection method comprising:

inputting an inspection signal to a first inspection wiring line, which is connected to first wiring lines of the wiring line group;

detecting an output signal from a second inspection wiring line that is connected to second wiring lines, which neighbor the first wiring lines; and detecting presence/absence of a wiring defect in the wiring line group on the basis of the output signal from the second inspection wiring line.

Specifically, in this inspection method, the probes 201 of the inspection device 200 are connected to the input pads of the pad section 144 of the main panel 1. The change-over section 204 connects the signal generating section 202 and the first inspection wiring line 151, and connects the signal detection section 203 and the second inspection wiring line 152.

Subsequently, at a predetermined timing, the signal generating section 202 inputs a switching signal to the switching signal line 153. By the input of the switching signal, the first switch elements 161 and second switch elements 162 of the scan line inspection section 142 are turned on at proper timings.

Upon turning on of the first switch elements 161, the signal generating section 202 inputs the inspection signal to the first inspection wiring line 151 that is connected to the first wiring lines 31 of the second wiring line group 30. On the other hand, upon turning on of the second switch elements 162, the signal detection section 203 detects the output signal from the second inspection wiring line 152 that is connected to the second wiring lines 32 of the second wiring line group 30.

Then, on the basis of the input of the inspection signal and the detection of the output signal, short-circuit between the first wiring line 31 and second wiring line 32 in the second wiring line group 30 is checked. Specifically, at a timing when signals can be input from the first wiring lines 31 of the second wiring line group 30, the inspection signal is input from the first inspection wiring line 151. In this case, if short-circuit occurs between the neighboring first wiring line 31 and second wiring line 32 in the second wiring line group 30, for example, if short-circuit occurs between the wiring line SW1 and wiring line SW2, the inspection signal is supplied not only to the wiring line SW1 but also to the wiring line SW2. Consequently, the inspection signal that is input from the first inspection wiring line 151 is output via the second inspection wiring line 152. Thus, when the signal detection section 203 detects the inspection signal coming from the second inspection wiring line 152, short-circuit between the first wiring line 31 and second wiring line 32 is detected.

Similarly, in the case where the change-over section 204 connects the signal generating section 202 and the second inspection wiring line 152 and connects the signal detection section 203 and the first inspection wiring line 151, the inspection signal is input from the second inspection wiring line 152 and the output signal coming from the first inspection wiring line 151 is detected. Thereby, short-circuit occurs between the first wiring line 31 and second wiring line 32 in the second wiring line group 30 can be checked.

As has been described above, according to the inspection method, in the liquid crystal display device with such a layout that driving signals can be supplied to the main panel and sub-panel from both end sides of the effective display section, the inspection device inputs, at different timings, the inspection signal to one of the neighboring first wiring line and second wiring line, which constitute the wiring line group that is connected to the scan lines of the sub-panel, and detects the output signal from the other of the neighboring first wiring line and second wiring line. Based on the input of the inspection signal and the detection of the output signal, it is possible to exactly detect a wiring defect in the wiring line group. In this manner, a wiring defect of the wiring line group, which supplies the driving signals to the sub-panel, can be detected at a stage prior to coupling the main panel and sub-panel. Thus, it is possible to prevent a main panel with a wiring defect from going to a subsequent fabrication step, and to suppress a decrease in manufacturing yield.

The present invention is not limited to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

The display device of the present invention is not limited to the above-described liquid crystal display device. The invention is applicable to various display devices with such a layout that a first wiring line group and a second wiring line group are provided on both end sides of the effective display section. For instance, the invention is applicable to an organic electroluminescence display device including self-luminous elements as display elements.

What is claimed is:

1. A display device comprising:

an effective display section composed of a plurality of display pixels;

a first wiring line group that is disposed on one end side of a peripheral part, which is located on an outside of the effective display section, and that comprises wiring lines connected to odd-number-th scan lines, to which driving signals for turning on/off the display pixels on odd-number-th rows are supplied;

a second wiring line group that is disposed on the other end side of the peripheral part, and comprises wiring lines connected to even-number-th scan lines, to which driving signals for turning on/off the display pixels on even-number-th rows are supplied;

a first inspection wiring line that is connected to first wiring lines of the first wiring line group;

a second inspection wiring line that is connected to second wiring lines of the first wiring line group, which neighbor the first wiring lines;

a third inspection wiring line that is connected to third wiring lines of the second wiring line group; and a fourth inspection wiring line that is connected to fourth wiring lines of the second wiring line group, which neighbor the third wiring lines, wherein the effective display section is provided on a liquid crystal display panel in which a liquid crystal layer is interposed between an array substrate and a counter-substrate, wherein the first to fourth inspection wiring lines are disposed on an extension part of the array substrate, which extends outward beyond an end portion of the counter-substrate, further comprising a driving IC chip that is disposed at a position corresponding to an area where the first to fourth inspection wiring lines are disposed, and wherein the driving IC chip includes a first driving unit that supplies the driving signals to the odd-number-th scan lines, a second driving unit that supplies the driving signals to the even-number-th scan lines, and a signal line driving section that is sandwiched between the first driving unit and the second driving unit.

2. The display device according to claim 1, wherein one end portion of each of the first to fourth inspection wiring lines is provided with an input pad that enables input of a driving signal.

3. An inspection method for a display device, the display device comprising:

an effective display section composed of a plurality of display pixels;

a first wiring line group that is disposed on one end side of a peripheral part, which is located on an outside of the effective display section, and that comprises wiring lines connected to odd-number-th scan lines, to which driving signals for turning on/off the display pixels on odd-number-th rows are supplied; and a second wiring line group that is disposed on the other end side of the peripheral part, and comprises wiring lines connected to even-number-th scan lines, to which driving signals for turning on/off the display pixels on even-number-th rows are supplied, the inspection method comprising:

inputting a first inspection signal to a first inspection wiring line, which is connected to first wiring lines of the first wiring line group, and to a second inspection wiring line that is connected to second wiring lines of the first wiring line group, which neighbor the first wiring lines, and inputting a second inspection signal to a third inspection wiring line, which is connected to third wiring lines of the second wiring line group, and to a fourth inspection wiring line that is connected to fourth wiring lines of the second wiring line group, which neighbor the third wiring lines;

inspecting, on the basis of the input of the first and second inspection signals, a wiring defect in the odd-number-th scan lines and the even-number-th scan lines in the effective display section; inputting the first inspection signal to the first inspection wiring line and the third inspection wiring line, and inputting the second inspection signal to the second inspection wiring line and the fourth inspection wiring line; and inspecting, on the basis of the input of the first and second inspection signals, a wiring defect in the first wiring line group and a wiring defect in the second wiring line group.

4. An inspection device for a display device, the display device comprising:

an effective display section composed of a plurality of display pixels;

a first wiring line group that is disposed on one end side of a peripheral part, which is located on an outside of the effective display section, and that comprises wiring lines connected to odd-number-th scan lines, to which driving signals for turning on/off the display pixels on odd-number-th rows are supplied; and a second wiring line group that is disposed on the other end side of the peripheral part, and comprises wiring lines connected to even-number-th scan lines, to which driving signals for turning on/off the display pixels on even-number-th rows are supplied, the inspection device comprising:

signal generating means for generating inspection signals; and signal input means for inputting the inspection signals, which are generated by the signal generating means, respectively to a first inspection wiring line that is connected to first wiring lines of the first wiring line group, to a second inspection wiring line that is connected to second wiring lines of the first wiring line group, which neighbor the first wiring lines, to a third inspection wiring line that is connected to third wiring lines of the second wiring line group, and to a fourth inspection wiring line that is connected to fourth wiring lines of the second wiring line group, which neighbor the third wiring lines, wherein the signal generating means generates a first inspection signal and a second inspection signal, and the signal input means inputs, in a first inspection step, the first inspection signal to the first inspection wiring line and the second inspection wiring line and the second inspection signal to the third inspection wiring line and the fourth inspection wiring line, and inputs, in a second inspection step, the first inspection signal to the first inspection wiring line and the third inspection wiring line and the second inspection signal to the second inspection wiring line and the fourth inspection wiring line.

5. The inspection device according to claim 4, further comprising:

a first probe that is connectable to an input pad provided at one end of the first inspection line;

a second probe that is connectable to an input pad provided at one end of the second inspection line;

a third probe that is connectable to an input pad provided at one end of the third inspection line; and a fourth probe that is connectable to an input pad provided at one end of the fourth inspection line.

6. A display device having a first effective display section composed of a plurality of display pixels, the display device comprising:

a connection pad that is capable of connecting a second effective display section composed of a plurality of display pixels;

a first wiring line group that is disposed on one end side of a peripheral part, which is located on an outside of the first effective display section, and that comprises a plurality of wiring lines, to which driving signals for turning on/off the display pixels of the first effective display section are supplied;

a second wiring line group that is disposed on the other end side of the peripheral part, and comprises a plurality of wiring lines, which supply driving signals for turning on/off the display pixels of the second effective display section via the connection pad;

a first inspection wiring line that is connected to first wiring lines of the second wiring line group; and a second inspection wiring line that is connected to second wiring lines of the second wiring line group, which neighbor the first wiring lines wherein the wiring lines of the second wiring line group are connected to scan lines of the second effective display section via the connection pad.

7. The display device according to claim 6, wherein one end portion of each of the first and second inspection wiring lines is provided with an input pad that enables input of a driving signal.

8. The display device according to claim 6, further comprising a flexible print circuit board that is electrically connected to the second effective display section via the connection pad.

9. A display device having a first effective display section composed of a plurality of display pixels, the display device comprising:

a connection pad that is capable of connecting a second effective display section composed of a plurality of display pixels;

a first wiring line group that is disposed on one end side of a peripheral part, which is located on an outside of the first effective display section, and that comprises a plurality of wiring lines, to which driving signals for turning on/off the display pixels of the first effective display section are supplied;

a second wiring line group that is disposed on the other end side of the peripheral part, and comprises a plurality of wiring lines, which supply driving signals for turning on/off the display pixels of the second effective display section via the connection pad;

a first inspection wiring line that is connected to first wiring lines of the second wiring line group; and a second inspection wiring line that is connected to second wiring lines of the second wiring line group, which neighbor the first wiring lines, wherein signal lines of the first effective display section are connected to signal lines of the second effective display section via the connection pad.

* * * * *